United States Patent [19]

Long

[11] 3,946,542
[45] Mar. 30, 1976

[54] TOBACCO HARVESTING AND TREATING SYSTEM

[75] Inventor: William R. Long, Tarboro, N.C.

[73] Assignee: Long Mfg. N. C., Inc., Tarboro, N.C.

[22] Filed: Jan. 31, 1975

[21] Appl. No.: 546,168

[52] U.S. Cl. .................... 56/1; 56/27.5; 56/DIG. 2
[51] Int. Cl.² ........................................ A01D 45/16
[58] Field of Search ............ 56/27.5, 228, 1; 34/22, 34/23, 30, 34, 38; 214/5.5

[56] References Cited
UNITED STATES PATENTS

| | | | |
|---|---|---|---|
| 2,940,615 | 6/1960 | Long et al. | 214/5.5 |
| 3,203,562 | 8/1965 | Long | 214/5.5 |
| 3,215,288 | 11/1965 | Long et al. | 214/5.5 |
| 3,229,831 | 1/1966 | Long | 56/27.5 X |
| 3,507,103 | 4/1970 | Pickett et al. | 56/27.5 |
| 3,695,014 | 10/1972 | Alphin et al. | 56/27.5 |
| 3,834,137 | 9/1974 | Long | 56/27.5 |

Primary Examiner—Russell R. Kinsey
Attorney, Agent, or Firm—A. Yates Dowell, Jr.

[57] ABSTRACT

A method and apparatus for harvesting and treating tobacco in which the tobacco plants are automatically defoliated as a harvester moves through a field. The tobacco leaves are discharged in a random haphazard manner into a large bulk container where the leaves are secured in position and then the containers are placed within a treating barn and the leaves are cured.

3 Claims, 12 Drawing Figures

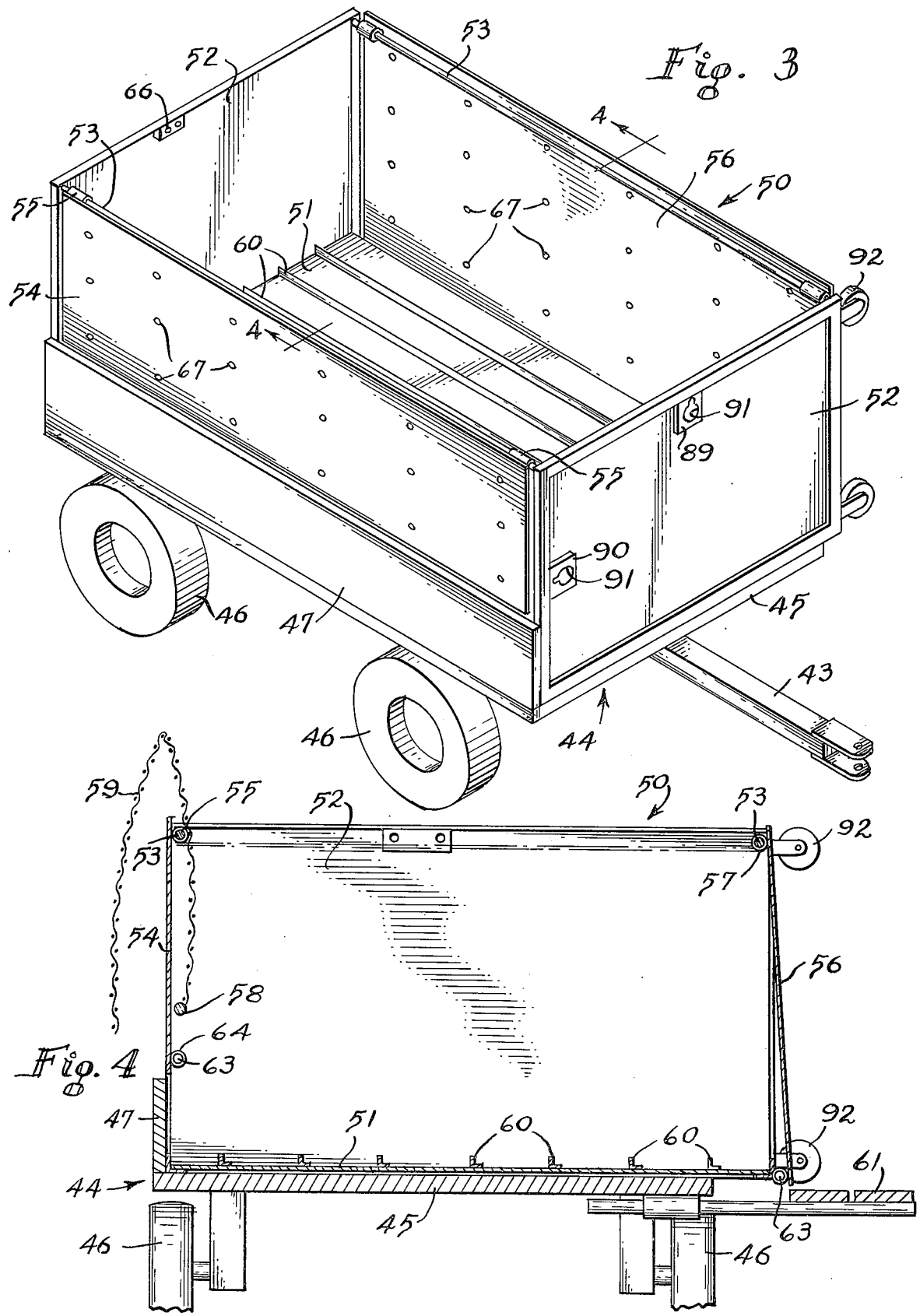

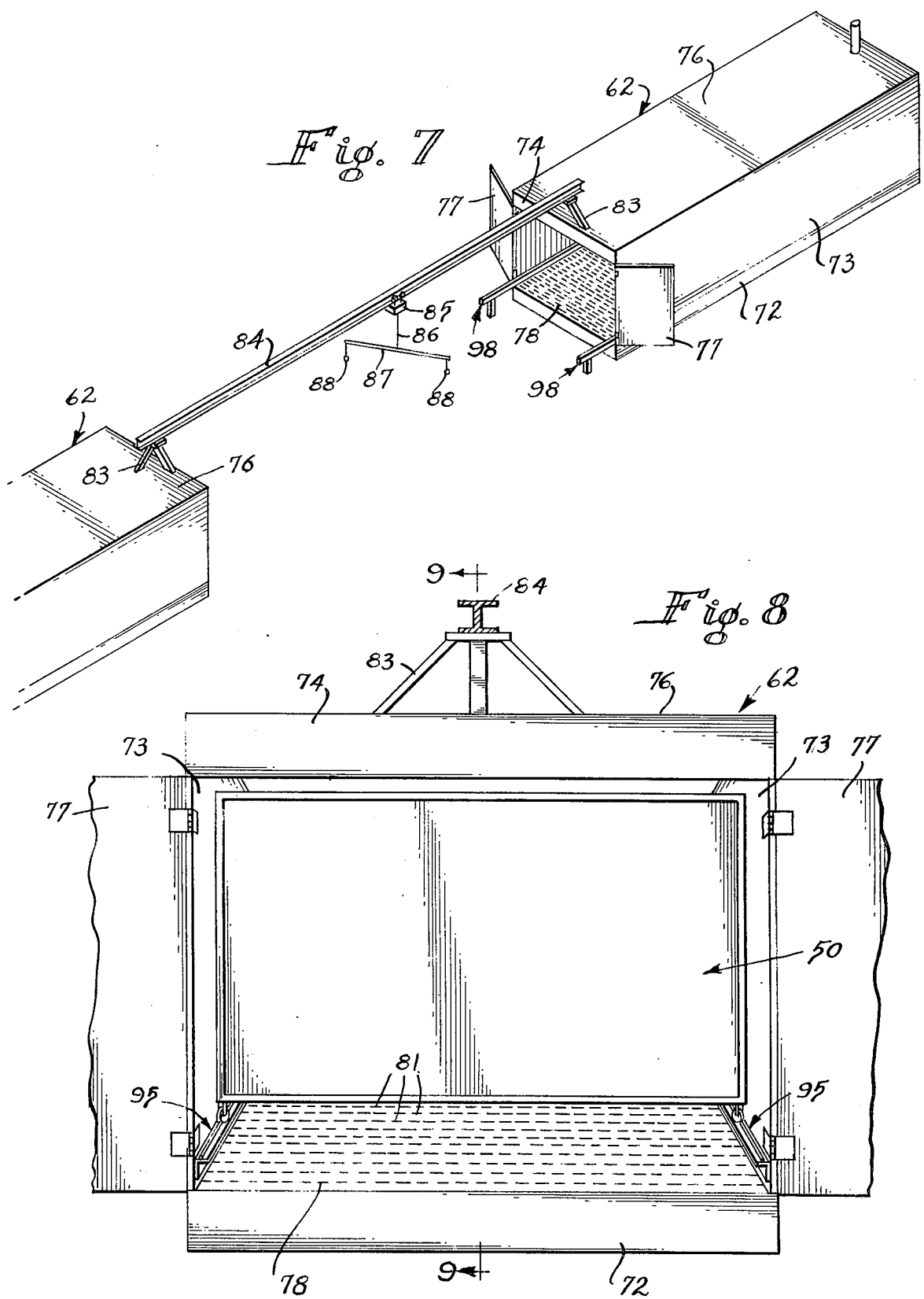

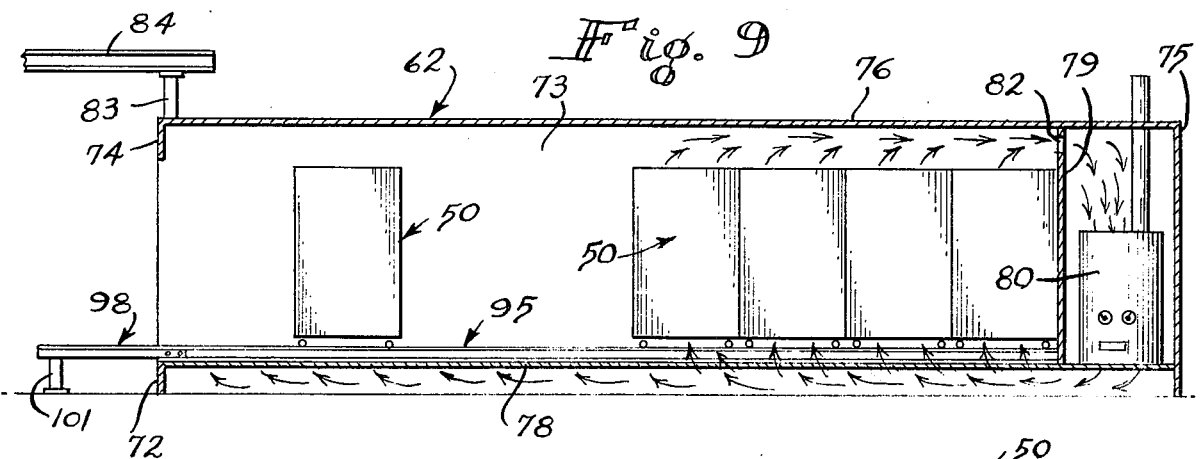
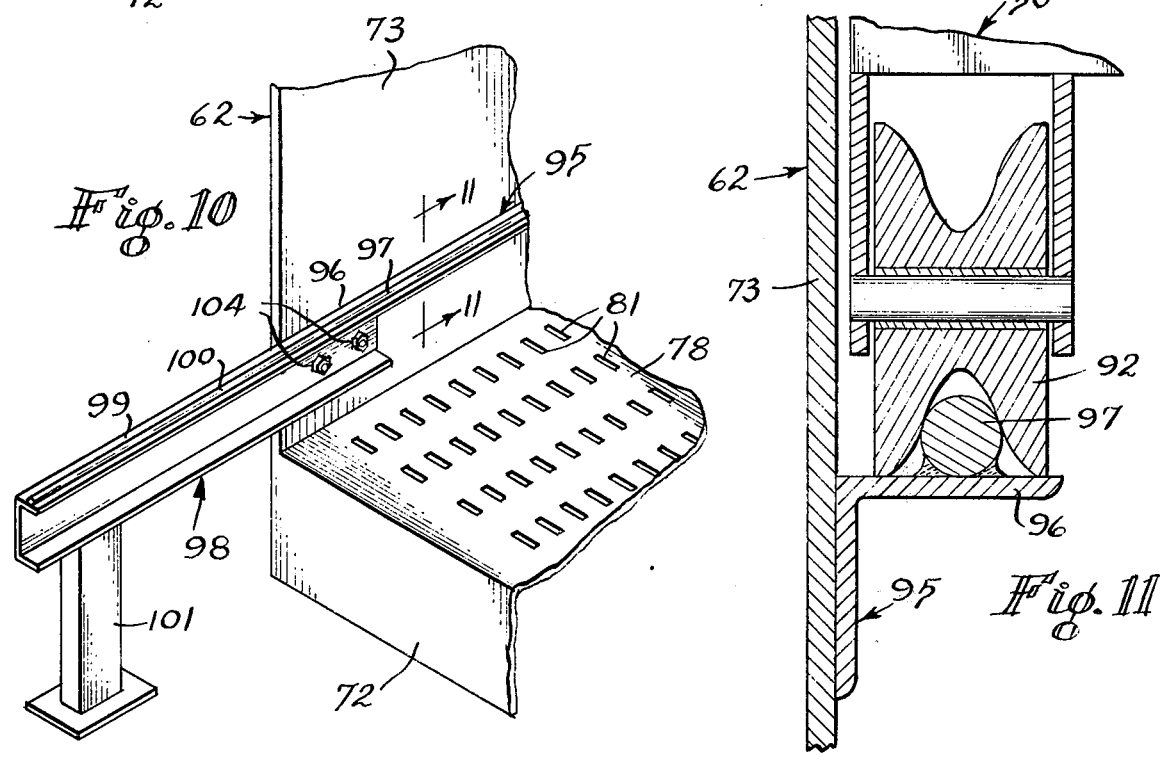
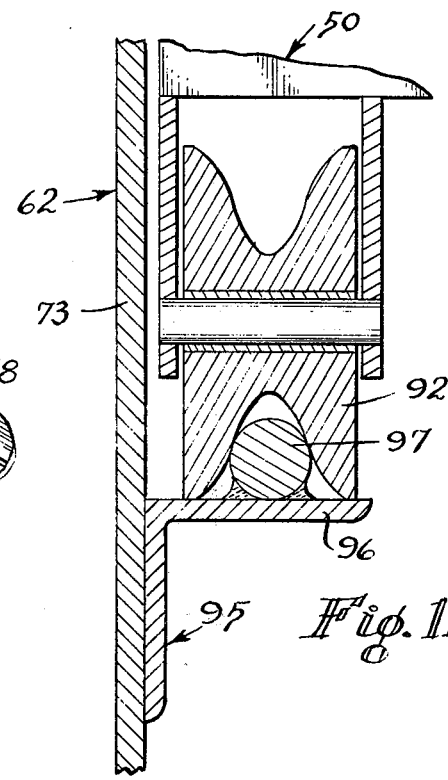
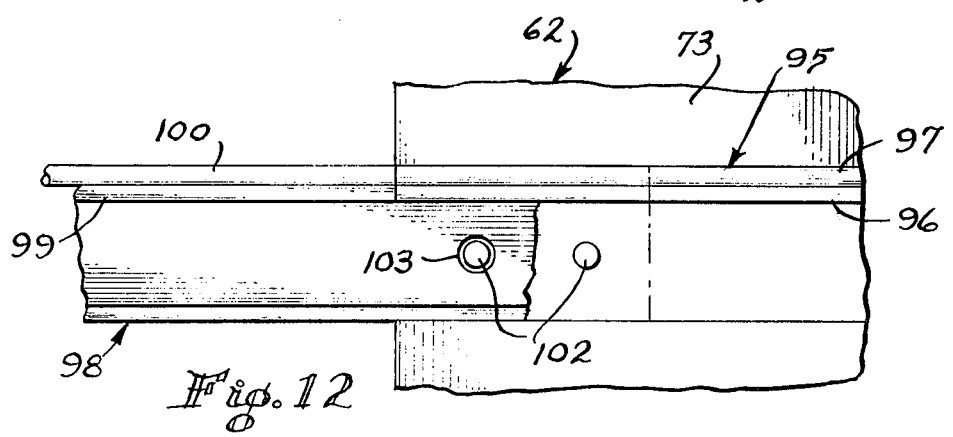

TOBACCO HARVESTING AND TREATING SYSTEM

BACKGROUND OF THE INVENTION

1. Field of the Invention

This invention relates generally to the harvesting and treating of agricultural crops and relates particularly to the method and apparatus for harvesting and treating tobacco in an efficient economical manner.

2. Description of the Prior Art

In the past flue cured bright leaf tobacco has been harvested one leaf at a time as the leaves matured on the plants and several leaves were oriented so that the stems were all located in the same general area and were bound together to form a hand. A plurality of hands were placed on a stick and a plurality of sticks were placed in a barn where such leaves were subjected to heat for curing.

The harvesting and treating of tobacco leaves has been hard back-breaking labor which often involved entire families and groups of families working together. The leaves of most tobacco plants mature from the group up over a period of from four to six weeks and it was necessary for each plant to be inspected periodically so that the mature leaves could be removed while the immature leaves remained on the stalk to continue developing. This obviously necessitated many passes through the field in order to harvest all of the usable tobacco leaves.

Many efforts have been made by individuals, manufacturing companies and several colleges and universities to ease the task of harvesting and treating tobacco leaves by reducing the labor and drudgery involved as well as to increase the efficiency of the operation and make the operation more economical. Initially harvesting machines were developed which transported workmen through the tobacco fields and permitted workmen on the lower portions of the machine to prime mature leaves so that other workmen could bind the leaves together in hands and place the hands on sticks for curing within the tobacco barns. Some examples of this type of structure are disclosed in the U.S. Pat. No. to Long 2,952,370 and 3,215,288.

More recently bulk harvesting of the tobacco leaves became practical in which the tobacco leaves were placed in a random haphazard manner within a tobacco rack of a height less than the length of a mature tobacco leaf and such racks were placed in two or three tiers within a tobacco barn for curing. Some examples of this type of structure are the U.S. Pat. No. to Long 3,233,339; and Hassler U.S. Pat. No. 3,105,713, 3,110,326 and 3,251,620.

With the advent of the bulk curing rack, automatic defoliating harvesters were developed which automatically removed tobacco leaves within a predetermined range above the ground as the harvesters moved through the tobacco fields. Such defoliators were adjustably mounted on the harvesters so that several passes through the tobacco field could be made at spaced intervals of time and with the defoliators located at different elevations so that substantially all of the usable tobacco leaves were removed from the stalks. Some examples of this type of harvester are the patents to Wilson U.S. Pat. Nos. 2,816,411, 2,834,175 and 3,083,517; Suggs et al U.S. Pat. No. 2,834,174; Splinter U.S. Pat. No. 3,093,949; Pickett et al U.S. Pat. No. 3,507,106; and Long U.S. Pat. No. 3,834,137.

Recently the South Carolina Agricultural Experiment Station at Clemson University in Clemson, South Carolina, has developed a technique for growing low profile tobacco. In this technique, the growth of tobacco plants is controlled and the upper portion of each tobacco plant is topped or removed so that substantially all of the tobacco leaves remaining on the stalk mature at substantially the same time whereby all of the leaves left on each stalk can be harvested simultaneously.

In order to grow low profile tobacco and to extend the harvesting season over approximately a six week period, one third of the tobacco plants usually are of an early variety and are planted at one time, a second third of the tobacco plants are of a mid-season variety which are planted later than the early variety, and the last third are of a late variety which are planted after the second third. After the plants have attained a height of approximately 30 inches, the top 6 inches is removed to leave a stalk substantially 24 inches high. Thereafter by controlling the amount of fertilizer and other plant nutrients approximately one-half of the first third are caused to mature at the same time and the other half of the first third are caused to mature approximately one week later. The first half of the second third is caused to mature approximately one week after the first third and so on through the entire tobacco crop whereby a portion of the crop matures each week for approximately six weeks which is the normal harvesting period for tobacco leaves.

In order to harvest low profile tobacco, Alphin and Pitner of Clemson University developed a tobacco harvester which was granted U.S. Pat. No. 3,695,014 that simultaneously removes all of the leaves remaining on a tobacco stalk so that the harvester makes only one pass by each individual tobacco stalk. Even though the tobacco plants have been topped, the remaining leaves reach a stage of development such that they yield approximately 85% as much tobacco as conventionally grown plants.

SUMMARY OF THE INVENTION

The present invention is embodied in a method and apparatus for harvesting and treating tobacco leaves in an efficient economical manner so that two workmen using relatively inexpensive equipment can easily handle a task which previously required many workmen to accomplish. An automatic defoliator, such as that disclosed in Alphin et al U.S. Pat. No. 3,695,014, is mounted on one side of a conventional tractor and such defoliator strips substantially all of the leaves from the tobacco stalk as the tractor is driven through the tobacco field. After the tobacco leaves are stripped from the stalk, such leaves are conveyed upwardly and discharged from the rear of the defoliator into a large bulk container mounted on a trailer which is connected to the tractor.

The bulk container is of a size to accommodate approximately 3,500 pounds or 16 small racks of green tobacco and includes an elongated relatively wide imperforate side member having an imperforate end member at each end thereof. The opposite side of the container is separated into two portions with each portion being swingably mounted so that the side portions can be swung outwardly to cover opposite ends of the container during the defoliating and loading process whereby only the side of the container is open or such portions can be swung inwardly and locked in position to close the side of the container whereby only the top and bottom are open. Each of the movable side portions has a plurality of openings through which slender elongated rods are adapted to be pushed through the tobacco leaves within the container to support the tobacco leaves therein.

In passing through the tobacco fields, one workman drives the tractor while a second workman is located on a platform carried by the trailer. The second workman spreads the tobacco leaves evenly throughout the container. After the container has been filled, which normally requires 8 to 20 minutes, the tractor with the filled container is driven to a tobacco curing barn where the container is removed from the trailer and rotated substantially 90° so that the tobacco leaves are supported only by the rods extending therethrough. Each of the containers has wheels along the bottom so that the container can be easily rolled into a curing barn by one man after the weight of the container is supported by the wheels. The tobacco curing barn has a heater at one end which discharges heated air into a plenum chamber located along the entire bottom of the barn. A pair of guide tracks are located along the entire length of the barn from the doors at the end opposite the heater to a wall which separates the heater compartment from the remainder of the barn. An extension is selectively connected to each of the guide tracks so that the guide tracks extend outwardly of the barn when the doors are open. After the container has been rotated to an upright position, the wheels of the container are placed on the guide track extensions and one workman pushes the container into the barn while the other workman is loading another container onto the wagon. The containers are of a size such that approximately eight containers will completely fill a 30 foot barn. Two people can harvest and fill two curing barns in a day.

It is an object of the invention to provide a method of harvesting and treating tobacco leaves in an efficient economical manner by providing an automatic leaf defoliator which strips substantially all of the tobacco leaves from low profile tobacco stalks and discharges such leaves with randomly oriented stems into a large container, after which such leaves are secured in position and the container is rolled into a tobacco barn and cured.

Another object of the invention is to provide apparatus for harvesting and treating tobacco leaves in such a manner that two men can harvest and fill two tobacco barns in a day.

BRIEF DESCRIPTION OF THE DRAWINGS

FIG. 3 is a perspective of a trailer with a tobacco receiving container mounted thereon.

FIG. 4 is an enlarged section on the line 4—4 of FIG. 3.

FIG. 7 is a perspective of a pair of opposed tobacco barns and including the container handling apparatus.

FIG. 8 is an enlarged front perspective of one of the barns.

FIG. 9 is a section on the line 9—9 of FIG. 8 to a reduced scale.

FIG. 10 is a perspective of a lower corner of the barn with the extension in place.

FIG. 11 is an enlarged section on the line 11—11 of FIG. 10 and showing a guide track with a container wheel in position.

FIG. 12 is an enlarged side elevation of the track and extension.

DESCRIPTION OF THE PREFERRED EMBODIMENT

Figure 1:
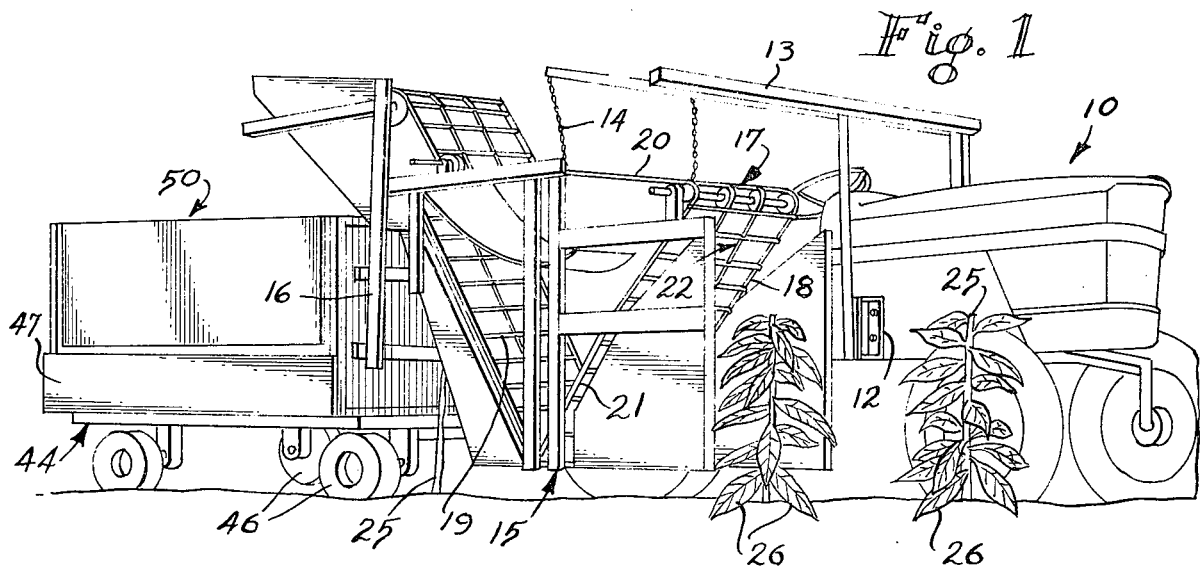
FIG. 1 is a perspective illustrating the defoliator in operation.
Figure 2:
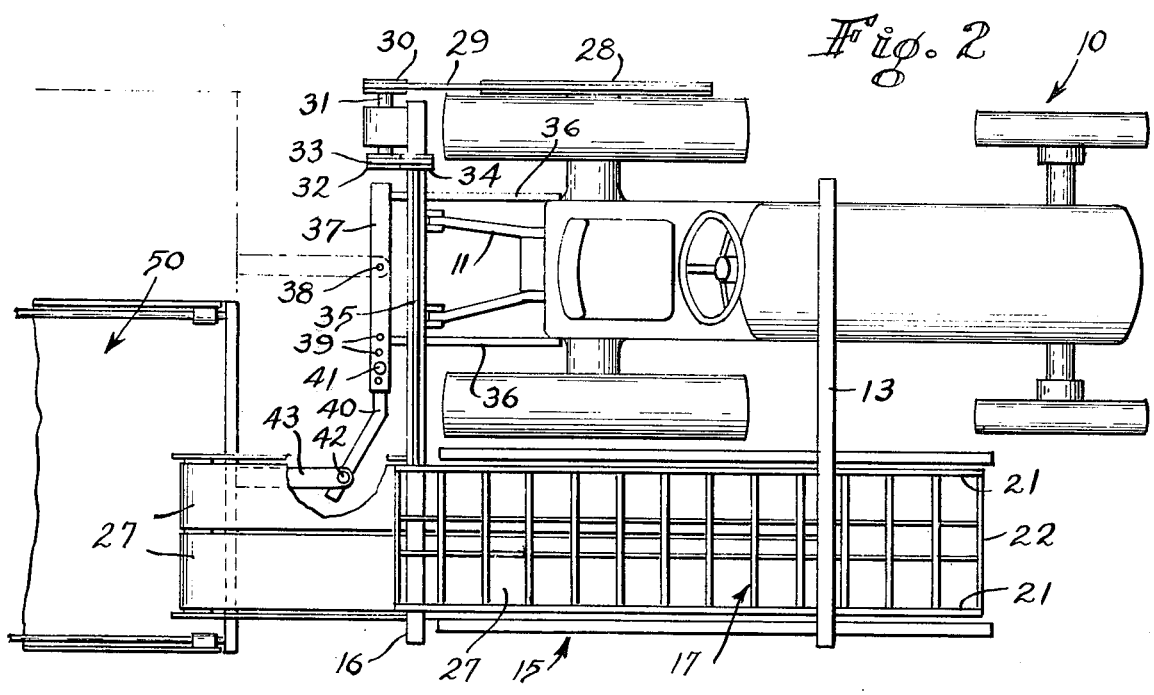
FIG. 2 is a top plan view thereof.

With continued reference to the drawings, a conventional tractor or other vehicle 10, which preferably is in the 35 to 45 hp range, has a three-point mast hitch 11 and is provided with mounting brackets 12 (only one of which is shown) for removably mounting a front support member 13. The front support member extends outwardly to one side of the tractor and is connected by chains or other flexible connections 14 to the front portion of a defoliator frame 15 of a harvester of the type generally disclosed in the Alphin and Pitner U.S. Pat. No. 3,695,014. The mast hitch 11 at the rear of the tractor is connected to a rear support member 16 which extends outwardly to one side of the tractor and is adapted to support the rear portion of the defoliator frame 15.

The defoliator frame 15 movably supports a generally triangular shaped defoliator 17 having a downwardly and rearwardly inclined first portion 18, an upwardly and rearwardly inclined second portion 19 and a forwardly extending third portion 20. The defoliator has a pair of generally parallel chains 21 connected by a flexible grid 22 which is driven at a speed such that the rearward speed of each individual segment of the grid is substantially the same as the forward speed of the tractor so that the speed of each individual segment of the grid of the first and second portions of the defoliator is substantially zero relative to the ground.

As the tractor moves through the field of tobacco plants, the stalks 25 of the tobacco plants are received within the grid 22 of the first portion 18 of the defoliator 17 so that the stalks remain upstanding while the grid 22 pushes the leaves 26 of the tobacco plants downwardly to strip all of the leaves from the stalks.

A pair of generally parallel conveyor belts 27 are located beneath and parallel to the second portion 19 of the defoliator and are spaced therefrom a short distance so that the tobacco leaves which are stripped from the stalks 25 are trapped between the conveyor belts 27 and the second portion 19 of the defoliator. Such leaves are lifted off of the stalks as the stalks pass through the defoliator 17 at substantially zero ground speed. After the leaves have been stripped from the stalks, such stalks remain in upstanding position while the leaves are discharged as a mass from the rear of the conveyor belts.

In order to drive the defoliator 17, an enlarged drive sprocket or pulley 28 is bolted to the wheel of the tractor 10 and such gear drives a chain or pulley 29 connected to a driven sprocket 30 mounted on a shaft 31. A drive sprocket 32 is mounted on the opposite end of the shaft 31 and is connected by the chain 33 to a driven sprocket 34. The driven sprocket 34 is mounted on a shaft 35 which drives the defoliator 17 and the conveyor belts 27. Since the drive sprocket 28 is directly driven by the tractor wheel, the speed of the first and second portions of the defoliator will remain at zero ground speed regardless of the speed at which the tractor is driven through the field. The above apparatus is described generally in the alphin and Pitner U.S. Pat. No. 3,695,014.

At the rear of the tractor 10 a pair of rearwardly extending arms 36 are connected to a tubular draw bar 37 having a pin receiving opening 38 substantially along the longitudinal center of the tractor and a plurality of openings 39 at one end of the draw bar. A draw bar extension 40 is telescopically received within the draw bar 37 and such extension is provided with an opening (not shown) which is adapted to be aligned with one of the openings 39 so that a pin 41 can be inserted through the aligned openings to lock the draw bar and the extension in adjusted position. The outer end of the extension 40 has an opening for receiving a pin 42 by means of which the tongue 43 of a wagon 44 can be connected to the draw bar. It is noted that when the tractor is travelling from place to place, the tongue of the wagon is aligned with the openings 38 and the pin 42 is inserted therethrough so that the trailer is disposed directly behind the tractor and when the tractor is moving through the tobacco fields, the tongue of the wagon 44 is aligned with the opening in the outer end of the extension 40 so that the wagon is located directly behind the defoliator 17.

The wagon 44 includes a bed 45 supported by ground-engaging wheels 46. A baffle board 47 is fixed to one side of the bed 45 and extends upwardly therefrom for a purpose which will be described later.

A bulk tobacco container 50 is removably mounted on the upper surface of the bed 45 and such container includes a large imperforate side wall 51 with an imperforate end wall 52 connected to each end thereof. The corners of the end walls 52 remote from the side wall 51 are connected by rods 53 to provide a rigid structure. An upper side portion 54 is provided with a pair of spaced sleeves 55 which rotatably receive the upper rod 53 and a lower side portion 56 is swingably mounted on the lower rod 53 by sleeves 57.

As illustrated best in FIGS. 3 and 4, the upper and lower side portions 54 and 56 are swung outwardly so that the lower side portion substantially completely closes the bottom of the container and the upper side portion extends downwardly substantially to the baffle board 47 to close the top of the container so that in this position the side only of the container is open. With particular reference to FIG. 4, a rod 58 extends across the central portion of the top of the container and such rod rotatably supports a heavy duty screen or other flexible perforate member 59. A plurality of angular reinforcing and supporting members 60 are welded to the imperforate side wall 51 generally lengthwise thereof and substantially parallel with each other.

When the tobacco leaves have been stripped from the stalks by the defoliator 17, the mass of leaves is carried upwardly by the conveyor belts 27 and discharged from the rear of the defoliator so that the leaves fall by gravity into the open container 50. Ordinarily the leaves are flat and generally parallel with the imperforate side wall 51 while the stems are located in random haphazard directions. Preferably a workman standing on a platform 61 carried by the wagon 44 uses a pitch fork or other tool to spread the tobacco leaves substantially evenly and level throughout the container. Although the container can be of any size desired, a container having a side wall substantially 9 feet 6 inches long and 6 feet wide and end walls substantially 6 feet long and 3 feet 6 inches wide has been found satisfactory.

At the beginning of the filling operation, the screen 59 is rotated to a position where it extends outwardly of the container, as illustrated in FIG. 4, and after enough leaves have been discharged into the container to fill the container substantially two-thirds full, the tractor 10 is stopped and the screen is rotated to a position overlying the tobacco leaves after which the tobacco leaves within the container are compacted in any desired manner, as by the workman walking on the screen to compact the leaves until the screen is substantially flat and the container is approximately half filled.

Thereafter the tractor is driven through the tobacco field and continues to discharge tobacco leaves into the container and on top of the screen 59. The filling of the container continues until the tobacco leaves within the container are mounded up above the open side and substantially level at which time the tractor is driven to a tobacco barn 62. During the transportation to the barn, the movement of the trailer over the ground shakes the tobacco leaves and causes such leaves to settle slightly. At the barn the upper and lower side portions 54 and 56 are each swung through an arc of approximately 270° to a position overlying the tobacco leaves and the tobacco leaves are compacted until the upper and lower side portions are substantially in alignment with each other and generally parallel with the side wall 51. The swinging movement of the upper and lower side portions closes the open side of the container and opens the top and bottom thereof.

Figure 5:
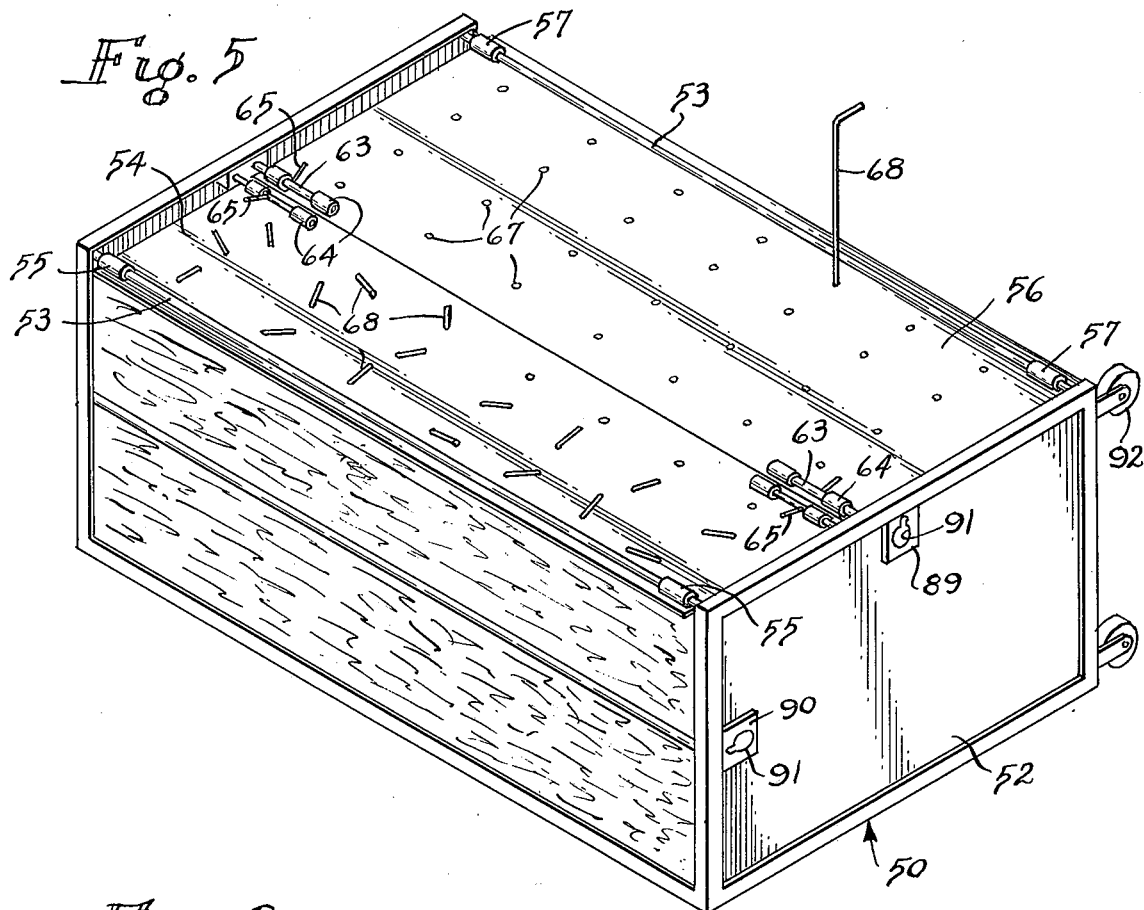
FIG. 5 is a perspective of a filled container.
Figure 6:
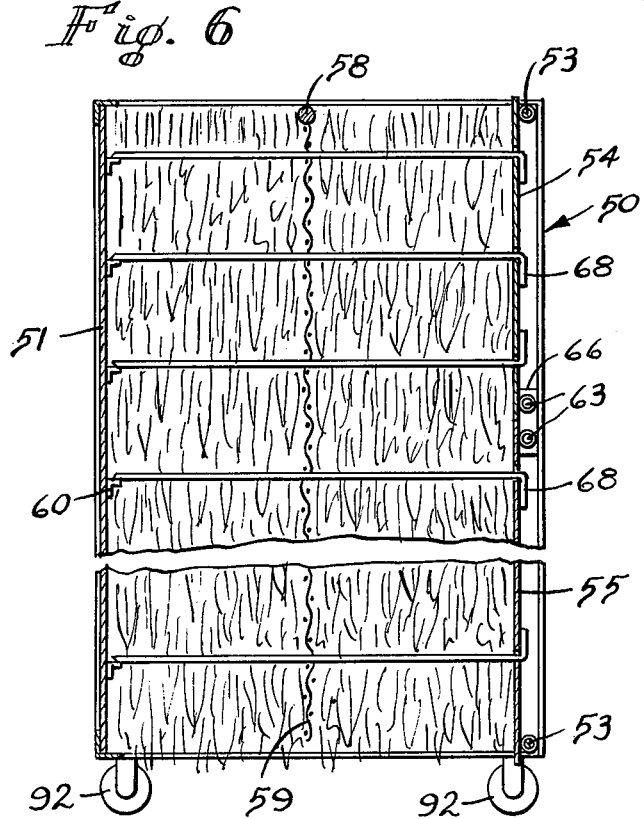
FIG. 6 is a vertical section of a filled container after the container has been rotated to an upright position.

In this position the upper and lower side portions are latched in any desired manner to hold such side portions in fixed position. With particular reference to FIG. 5, a slide bolt 63 is mounted in spaced sleeves 64 at each end of the upper and lower side portions and such slide bolts are adapted to be moved lengthwise by handles 65 so that the ends of the bolts are received within a socket member 66 carried by the end walls 52 of the container.

After the side portions 54 and 56 have been moved to the position shown in FIG. 5, it is necessary to secure the tobacco leaves in fixed position relative to each other within such container. In order to do this, each of the upper and lower side portions 54 and 56 is provided with a plurality of openings 67 through which a plurality of elongated slender rods 68 extend. The rods 68 are of a length to extend through the side portions 54 and 56 and through the tobacco leaves 26 and the screen 59 within the container to a position adjacent to the reinforcing member 60 so that when the container is rotated to an upright position the rods 68 are supported by the side portions 54 and 56, the screen 59, and the reinforcing members 60 and such rods support the tobacco leaves 26.

With particular reference to FIGS. 7–12, each of the barns 62 includes a base 72 which supports a housing having side walls 73, front wall 74, rear wall 75 and a top wall or roof 76. The front wall 74 is provided with a pair of doors 77 which can be selectively opened or closed. Within the barn a floor 78 extends the full length of the barn at the top of the base 72 so that the base defines a plenum chamber below the floor 78. Spaced inwardly from the rear wall 75 is a partition 79 defining a compartment in which a heater 80 is located. The heater 80 normally burns oil, gas or other combustible fuel which heats air and discharges the heated air into the plenum chamber within the base 72. The floor 78 has a multiplicity of slots 81 so that heated air can flow upwardly through the slots into the upper portion of the barn where such air can be returned through an opening 82 in the upper portion of the partition 79 to the heater 80 to be reheated.

As illustrated best in FIG. 7, a pair of barns 62 preferably are located in facing relationship with each other and each of the barns is provided with an upstanding A-frame 83 on the roof 76 and such A-frames support an I-beam 84. If desired instead of having opposed barns, one end of the I-beam can be supported by the A-frame of a single barn and the other end of the I-beam could be mounted on a support frame (not shown). A power operated hoist 85 is mounted on the I-beam 84 and is movable along such I-beam so as to service both of the opposed barns 62. The hoist 85 includes a power operated cable 86 the lower end of which is connected to a bridle 87 with a hook member 88 at each end.

When the tractor 10 pulls the wagon to a position below the I-beam 84, the hoist 85 is operated to lower the bridle 87 so that the hook members 88 can engage the container 50. In order to lift the container from the wagon, each of the end walls 52 of the container is provided with a pair of bosses or enlargements 89 and 90. The boss 89 is located generally centrally of the side of the end wall which supports the upper and lower side portions and the boss 90 is located adjacent to the central portion of the top of each end wall. Each of the bosses 89 and 90 is provided with a hook receiving opening 91 for cooperative engagement with the hook member 88.

After the side portions 54 and 56 have been closed and locked, as illustrated in FIG. 5, and the rods 68 have been inserted through the leaves of tobacco within the container, the bridle 87 is lowered so that the hook members 88 are received within the openings 91 of the bosses 89 and 90 after which the hoist 85 raises the bridle to lift the container off of the wagon 44. The driver of the tractor then moves the wagon from beneath the container and the container is lowered to the ground. If desired, the rods 68 can be inserted through the tobacco leaves after the container has been lowered to the ground.

When the rods 68 are in place, the hook members 88 are disengaged from the bosses 89 and are reapplied to the openings 91 of the bosses 90 so that when the hoist again raises the bridle 87 the container 50 is rotated substantially 90° to an upright position. The bottom of each of the end walls 52 is provided with a pair of pulley type wheels 92 for supporting the container in the upright position.

In order to roll the containers into the barn 62, each of the side walls 73 of the barn is provided with a guide track 95 adjacent to the floor 78. As illustrated best in FIGS. 10-12, each of the guide tracks includes an inwardly extending upper flange 96 having a rod or other upwardly extending projection 97 welded or otherwise attached to the upper surface thereof. As shown particularly in FIG. 11, each of the wheels 92 has a concavo-convex groove of a size to straddle the rod 97 and engage the upper flange 96 so that each wheel has substantially four points of contact with the guide track 95. It is noted that a wheel with a straight tapered belt type groove could be used to provide the four points of contact.

In order to position the containers 50 on the guide tracks within the barns 62 during loading and unloading, an extension 98 is provided having an upper flange 99 with a rod 100 welded or otherwise attached to the upper surface thereof in a manner similar to the guide track 95. The outer end of the extension has a downwardly extending post 101 which is adapted to rest on the ground and support the outer end of the extension substantially in alignment with the guide track 95. Adjacent to the doors 77 of the barn, each of the guide tracks 95 is provided with a pair of spaced studs 102 which receive openings 103 located adjacent to the inner end of the extension 98. Nuts 104 are provided for securing the extension to the studs 102 in fixed position so that the upper flange 99 and the rod 100 of the extension are in alignment with and abutting the upper flange 96 and the rod 97 of the guide track 95.

Preferably the extension 98 extends outwardly from the barn approximately four feet so that after the container 50 has been rotated to an upright position the hoist 85 can lift the container and move the container along the I-beam 84 until the wheels 92 of the container are in a position overlying the extension 98. In this position the hoist 85 lowers the container until the wheels rest on the extension at which time the hook members 88 of the bridle are disengaged from the bosses 90. Thereafter one workman can push the container along the guide track 95 until the container is in abutting relationship with the partition 79 or with another container within the barn. Approximately eight containers arranged in side-by-side abutting relationship substantially completely fill the heat treating chamber of the barn.

If desired one or more seals can be provided between the side walls 73 of the barn and the end walls 52 of the container, as well as between adjacent containers so that warm air flowing through the slots 81 in the floor 78 from the plenum chamber must pass through the containers from the bottom to the top. When the barn 62 has been filled with containers, the doors 77 are closed and the heater 80 is energized to cause heated air to flow through the containers and treat the tobacco leaves. After the heat treating process has been completed, the heater is cut off, the doors 77 are opened, and the extensions 98 are reattached to the guide tracks 95.

Thereafter the containers 50 are rolled one at a time out of the barn onto the extensions where the containers can be reconnected to the bridle 87 so that the hoist 85 can lift the containers off of the extension and move such containers outwardly from the barn. While the containers are being supported by the hoist, the rods 68 are removed from the containers starting with the lowermost rods and working upwardly so that the cured leaves of tobacco fall by gravity from the container onto a tobacco pallet or other surface.

In the operation of the device, the tractor 10 with a defoliator 17 mounted thereon moves through a field of tobacco plants so that the defoliator strips substantially all of the leaves from the stalks and discharges the mass of leaves from the rear of the defoliator. A container 50 carried by a wagon 44 is located below and behind the discharge from the defoliator and such container is arranged in such a manner that the upper and lower side portions are swung outwardly to substantially close the top and bottom of the container so that the side only is open. As the leaves of tobacco are discharged into the container in a haphazard manner in which the leaves are substantially parallel with the imperforate side wall 51 of the container while the stems of such leaves are randomly oriented, a workman standing on the platform 61 spreads the leaves substantially evenly throughout the container.

When the container is more than half filled, the tractor is stopped and the screen 59 is placed across the leaves and the leaves are compacted until the screen 59 is substantially parallel with the side 51 of the container. Thereafter the tractor is driven through the field again while tobacco leaves are being discharged into the upper portion of the container until such tobacco leaves are mounded up above the sides of the container. In this position the tractor is driven to the treating barns where the rods 68 are inserted through the containers and the leaves of tobacco therein and the container is rotated substantially 90° to an upright position by the hoist 85. The hoist is operated to move the containers to a position overlying the extensions 98 which have been attached to the barn and the container is lowered until the wheels 92 of the container rest on the upper surface 99 and the rods 100 of the extensions. When the bridle 87 is disconnected from the container, the container can be pushed along the guide tracks 95 within the barn by a single workman. In this operation, since the defoliator removes substantially all of the leaves from the tobacco stalks, it normally requires from 8 to 20 minutes to completely fill a container. Therefore, two men can harvest enough tobacco to fill two barns in one day.

I claim:

1. In the harvesting and treating of tobacco using an automatic defoliator for stripping all of the tobacco leaves from a stalk and forming a mass of leaves adjacent to the bottom of the stalk, raising said mass of leaves from the stalk while maintaining substantially zero ground speed between the mass of leaves and the stalk, and conveying the mass of leaves upwardly and rearwardly from the stalk, the method comprising the steps of: discharging the mass of leaves into a relatively large container having a first side wall means positioned in a generally horizontal plane when the container is being filled and with the upper opposite side being open, distributing the tobacco leaves throughout the container so that the leaves are substantially flat and generally parallel with said first side wall means of the container, positioning second side wall means along the open side of the container and opening the top and bottom thereof when the container has been filled with tobacco leaves thereby providing a flow path in one direction through the container, inserting a plurality of pin means through at least one of said first and second side wall means, rotating the container substantially 90° so that the tobacco leaves are disposed in vertical planes, positioning the container within the interior of a tobacco barn having closure means and a selectively operable heater, closing the barn after the barn has been filled with containers, energizing said heater to provide heated air, causing the heated air to flow through the flow path in said containers to cure the tobacco leaves therein, removing the containers from the barn after said leaves have been cured, and discharging the cured tobacco leaves from said container.

2. In the harvesting and treating of tobacco using an automatic defoliator for stripping all of the tobacco leaves from a stalk and forming a mass of leaves adjacent to the bottom of the stalk, raising said mass of leaves from the stalk while maintaining substantially zero ground speed between the mass of leaves and the stalk, and conveying the mass of leaves upwardly and rearwardly from the stalk, the method comprising the steps of: discharging the mass of leaves into a relatively large container having a first side wall means positioned in a generally horizontal plane when the container is being filled and with the upper opposite side being open, distributing the tobacco leaves throughout the container so that the leaves are substantially flat and generally parallel with said first side wall means of the container, positioning a second side wall means on the open side of the container when the container has been filled with tobacco leaves, inserting a plurality of pin means through at least one of said side wall means and the tobacco leaves to hold the tobacco leaves in position, rotating the container substantially 90° so that the tobacco leaves are disposed along generally vertical planes, positioning the container within the interior of a tobacco barn, causing heated air to flow through said container to cure the tobacco leaves therein, removing the container from the barn after said leaves have been cured, and discharging the cured tobacco leaves from said container.

3. The method of claim 2 including the steps of inserting a partition within said container for separating portions of the tobacco leaves from other portions.

\* \* \* \* \*